No. 607,502.
J. P. CALDWELL.
COTTON SEED PLANTER.
(Application filed May 6, 1898.)
Patented July 19, 1898.
(No Model.)
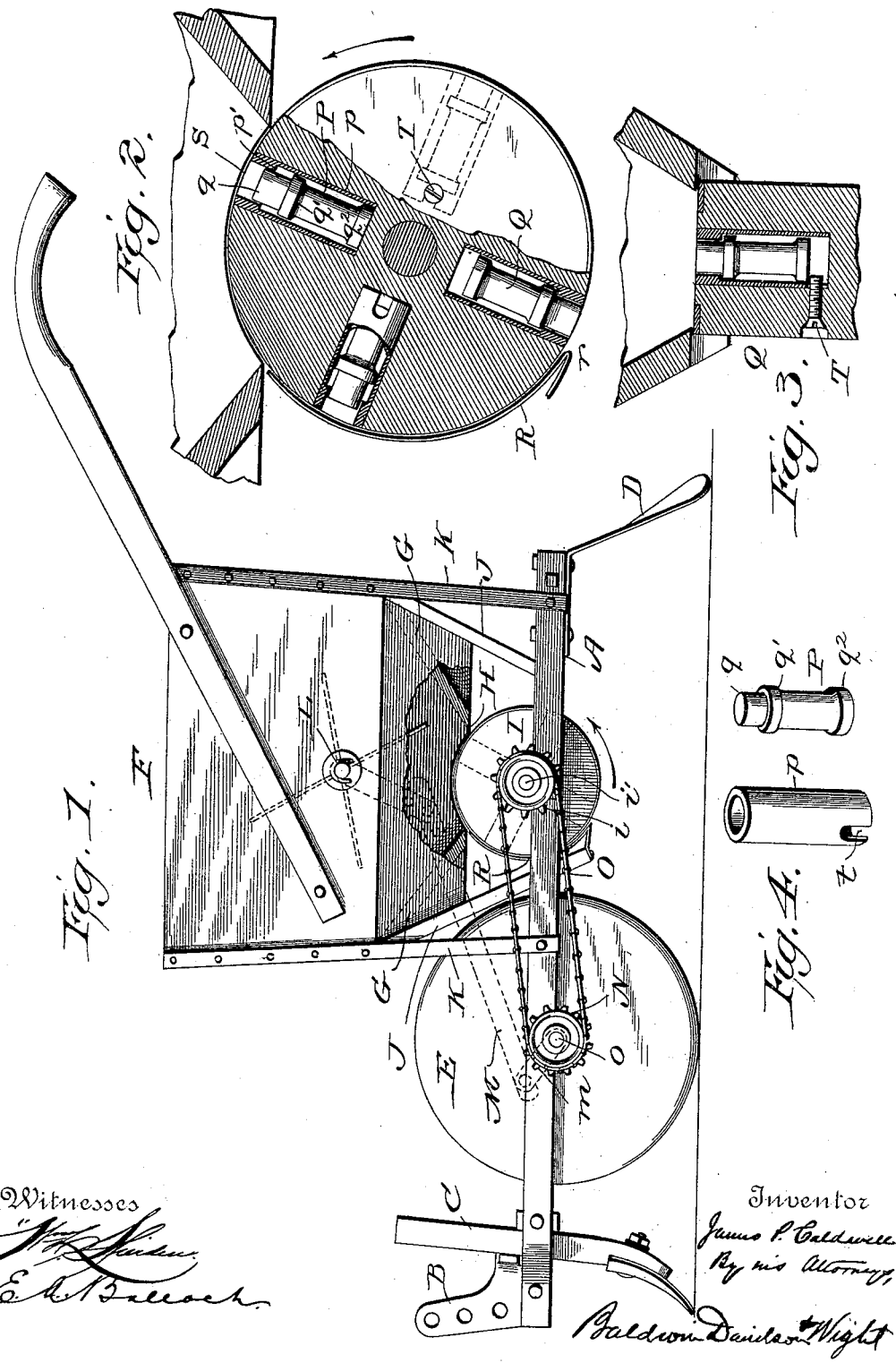

UNITED STATES PATENT OFFICE.

JAMES P. CALDWELL, OF WINNSBOROUGH, SOUTH CAROLINA.

COTTON-SEED PLANTER.

SPECIFICATION forming part of Letters Patent No. 607,502, dated July 19, 1898.

Application filed May 6, 1898. Serial No. 679,919. (No model.)

*To all whom it may concern:*

Be it known that I, JAMES P. CALDWELL, a citizen of the United States, residing at Winnsborough, in the county of Fairfield and State of South Carolina, have invented certain new and useful Improvements in Cotton-Seed Planters, of which the following is a specification.

The object of my invention is to provide an improved machine for planting cotton-seed at regular distances apart and in uniform quantities, so as to avoid the necessity of chopping the rows of cotton-plants after the seed have been planted.

Ordinary cotton-seed planters require about two bushels of seed to the acre, while machines made in accordance with my invention require but one bushel to three and a half or four acres. Attempts have heretofore been made to plant cotton in hills instead of in continuous rows; but such machines have not gone into use so far as my knowledge extends, owing to defects in the mechanism or such complexity therein as to render them impracticable. My machine, on the other hand, is extremely simple and does the work most efficiently.

In the accompanying drawings, Figure 1 is a side elevation, with some of the parts broken away, of a cotton-seed-planting machine embodying my improvements. Fig. 2 is an enlarged detail view showing particularly the construction of the seed-planting drum. Fig. 3 is another detail view of the seed-planting drum. Fig. 4 shows in detail and in perspective the seed-planting plunger and the sleeve or cylinder in which it works.

The main frame A may be of any suitable construction. It is provided with a clevis B and with a shovel-blade C and with covering-blades D, all of which are of the usual construction and operate in the usual way. A driving-wheel E is mounted in the main frame in front of the hopper F. The hopper may be of any suitable size and construction. It is provided with oppositely-inclined bottom pieces G, between the lower ends of which is an opening H, into which extends the upper part of the seed-planting drum I. The hopper is also provided with downwardly-projecting front and rear pieces J and with straps K, which secure it firmly to the main frame A.

Within the hopper is a stirrer L of well-known construction, and this is connected by means of pitmen and links M to a crank $m$ on the shaft $o$ of the drive-wheel E. The shaft $o$ carries a sprocket-pulley N, which is geared by a chain O with a sprocket-wheel $i$ on the shaft $i'$ of the seed-planting drum I. The drum I is provided with a number of cells P, into which are fitted sleeves or cylinders $p$. These cells and cylinders radiate from the center of the drum and open outwardly at the periphery thereof. Each sleeve is formed with a shoulder $p'$, which acts as a stop for the plunger Q. Each plunger is formed with an outer cylindrical portion $q$, that is adapted to work back and forth in that portion of the sleeve outside the shoulder $p'$. Below this cylindrical portion $q$ is a collar $q'$, and at the extreme inner end of the plunger is another collar $q^2$, the portion of the plunger between the collars $q'$ and $q^2$ being reduced in diameter.

The plungers are made of metal and are of sufficient weight to act automatically by gravity to move radially inward and outward at the proper time. The drum is geared to revolve in the direction indicated by the arrow in Fig. 1. A shield R, of sheet metal, is arranged in front of the drum and extends from the lower end of the hopper around the periphery of the drum to the lower portion thereof. When the drum is rotated as the machine moves forward, the cotton-seed contained in the hopper will enter the cup or cell S. As it passes through the hopper the seed will fill the cell, and as the drum revolves the seed will be held in the cell by the shield R until the cell has passed beyond the bottom $r$ of the shield. When this occurs, the plunger will move downwardly and forcibly expel the seed from the cell. The operation will be clearly understood from this description and from an inspection of the drawings. The plungers move inwardly and outwardly as the drum revolves, alternately opening the cups or recesses to receive the seeds and again expelling the seeds and closing the cells. The seeds are planted with absolute uniformity and in uniform quantities.

The exact sizes of the drive-wheel and the seed-planting drum are unimportant so long as they maintain proper relative sizes. The drawings show the drive-wheel E as of twice the diameter of the drum I. For instance, the drive-wheel may be forty-eight inches in circumference and the dropping-wheel twenty-four inches in circumference, and the drum is constructed to drop the seed twelve inches apart—that is to say, when the larger wheel goes over twelve inches of surface the dropper turns six inches, and as four plungers are employed they are arranged six inches apart, and one plunger operates once during the passage of the driving-wheel over twelve inches of surface. The same principle, however, may be carried out with wheels of different diameters by increasing or decreasing the circumference of the drive-wheel and making the seed-planting drum to correspond by placing the plungers in the proper way, or the number of plungers employed in the seed-planting drum may be decreased or increased to vary the distances between the hills of seed planted; but the number of plungers employed and the circumference of the seed-planting drum should always maintain a proper ratio to the circumference of the driving-wheel.

In order to lock the plungers so that they shall be inoperative, I employ screws T, which extend inwardly through the side of the drum I and into the inner ends of the sleeves or cylinders p. The screws preferably extend through slots or openings t in the sleeves and are adapted to extend beyond the inner ends of the plungers. Fig. 3 illustrates the manner of locking one of the plungers so that it fills the cup or recess S and prevents the plunger from reciprocating. When the plunger is thus locked, no seed is collected by the portion of the drum in which this plunger is located.

In practice my machine works most efficiently. The mechanism is simple, inexpensive, and can be easily operated without technical knowledge by those accustomed to planting cotton. The machine is also adapted to plant corn and is very useful for other purposes.

I am aware that seed-planting drums have heretofore been provided with weighted plungers which operate independently in radial recesses in the drum and that such plungers have been provided with means for holding one or more of them in a fixed position out of operation; but in no case has a radially-recessed drum been provided with shouldered tubes or sleeves coöperating with the plungers, each of which has a cylindrical portion at its outer end reduced in diameter and also a portion at its inner end reduced in diameter and provided with collars fitting the cylinder and also provided with set-screws at their inner ends, by means of which the plungers may be independently adjusted, so as to put one or more of them out of operation.

I claim as my invention—

The combination of a hopper, the driving-wheel, the cultivating-blades, the seed-planting drum, driving connections between the seed-planting drum and the driving-wheel, a series of shouldered hollow cylinders or sleeves arranged in radial recesses in the seed-planting drum, a series of independently-movable plungers, one for each sleeve, arranged to slide in said sleeves, and each of which has a cylindrical portion at its outer end smaller in diameter than the portion of the sleeve in which it works, and adapted to work back and forth therein past the shoulder and which also has a reduced portion in the inner end of the sleeve provided with one or more collars and a set-screw for fixing the plunger so as to close the sleeve if desired.

In testimony whereof I have hereunto subscribed my name.

JAMES P. CALDWELL.

Witnesses:
A. L. PORTER,
T. B. CATHCART.